United States Patent [19]
Kassai

[11] Patent Number: 4,746,140
[45] Date of Patent: May 24, 1988

[54] BABY CARRIAGE

[75] Inventor: Kenzou Kassai, Osaka, Japan

[73] Assignee: Aprica Kassai Kabushikikaisha, Osaka, Japan

[21] Appl. No.: 891,736

[22] Filed: Jul. 31, 1986

[30] Foreign Application Priority Data

Jul. 31, 1985 [JP] Japan .................................. 60-170416

[51] Int. Cl.⁴ .............................................. B62B 7/08
[52] U.S. Cl. ...................................... 280/642; 5/99 B;
5/102; 108/113; 280/42; 280/643; 280/650;
280/658
[58] Field of Search ................ 280/647, 658, 640, 641,
280/642, 650, 644, 42, 47.38, 651; 297/45;
108/112, 113; 5/99 R, 99 B, 101, 102, 103, 104;
248/166, 436

[56] References Cited

U.S. PATENT DOCUMENTS 4,220,351 9/1980 Fleischer ............................. 280/247
4,411,472 10/1983 Kassai .................................. 297/430
4,597,116 7/1986 Kassai .................................. 280/642

FOREIGN PATENT DOCUMENTS 2074281 10/1981 United Kingdom ................ 280/647

Primary Examiner—John J. Love
Assistant Examiner—Eric D. Culbreth
Attorney, Agent, or Firm—W. G. Fasse; D. H. Kane, Jr.

[57] ABSTRACT

A baby carriage has a pair of fron legs (1), a pair of rear legs (2), a seat section (60, 61), and lateral frames (15) each extending between the front and rear legs (1 and 2) on the respective side of the carriage, wherein each lateral frame is foldable in a lateral plane of the baby carriage. When the lateral frames assume are extended or unfolded, the front and rear legs are spaced away from each other to establish the opened state of the baby carriage. When the lateral frames are folded, the front and rear legs are moved toward each other to establish the closed state of the baby carriage.

4 Claims, 10 Drawing Sheets

FIG. 24

BABY CARRIAGE

BACKGROUND OF THE INVENTION

Field of the Invention

This invention relates to a foldable baby carriage and more particularly to a skeleton construction suitable for large-sized foldable baby carriages.

An examination of the history of change of baby carriages with attention paid to their seat sections shows that initially they were of the so-called box type and then changed to the chair type, which has since continued, and baby carriages with chair type seat sections are popular today. The reasons for switching from the box type to the chair type, included a desire for reducing the weight of the baby carriage and for making it more compact in the folded state.

Although the chair type baby carriage is convenient for use, the space allotted to its seat section is limited. As a result, the seat section is reduced in size to the extent that it has been difficult to sit or lay a baby there in a comfortable manner.

Accordingly, it has been proposed to add a function which makes the baby carriage compact in the closed state and which further increases the area of the seat section when the baby carriage is opened. For example, a function is proposed (for example, in Japanese Patent Publication No. 32067/1963; corresponding to U.S. Pat. No. 4,411,472) which makes the backrest of the seat section reclinable for placing a baby comfortably into the carriage by extending the seat portion of the seat section further forward to allow the baby to stretch his or her legs.

However, even if a backrest reclining mechanism or a seat portion extending function is added, as described above, the space available for the seat section has its limit. This is due mainly to the fact that the body of the baby carriage cannot be made so large because of the design requirement that the baby carriage be made compact when folded. For example, when the length of the seat section extending in the direction of travel of the baby carriage is increased to make it possible for a baby to be comfortably in the carriage lengthwise in the direction of travel of the baby carriage, it is necessary to lengthen the wheel base between the front and rear wheels of the baby carriage in order to stabilize the baby carriage and enhance its safety. Therefore, the members connecting these front and rear wheels are lengthened, resulting in a problem that the closed state of the baby carriage cannot be made so compact.

SUMMARY OF THE INVENTION

Accordingly, this invention is intended to provide a skeleton construction for baby carriages, whereby even if the seat section is increased in size and hence the skeleton of the baby carriage in the opened state is increased in size, the baby carriage can be compactly closed.

In brief, the invention is a baby carriage comprising a pair of front legs, a pair of rear legs, a seat section, and lateral frames each extending between the front and rear legs on the respective or same side of the carriage, wherein each lateral frame is foldable in a lateral plane of the baby carriage, whereby when the lateral frames assume the extended state, the front and rear legs are spaced away from each other to establish the opened state of the baby carriage, while when the lateral frames assume the folded state, the front and rear legs are moved toward each other to establish the closed state of the baby carriage.

According to this invention, since the lateral frames disposed on both sides of the seat section are foldable in lateral planes of the baby carriage, there is obtained a baby carriage which can be compactly folded even if the longitudinal dimension of the lateral frames is increased so as to lengthen the wheel base between the front and rear wheels and maintain a wide spacing between the front and rear legs.

Further, since the longitudinal dimension of the lateral frames can be increased, as described above, the seat section which is installed along the same can be increased in the longitudinal dimension; thus, a seat section can be obtained which provides a large space.

These objects and other objects, features, aspects and advantages of the present invention will become more apparent from the following detailed description of the present invention when taken in conjunction with the accompanying drawings.

DETAILED DESCRIPTION OF PREFERRED EXAMPLE EMBODIMENTS AND OF THE BEST MODE OF THE INVENTION

Figure 1:
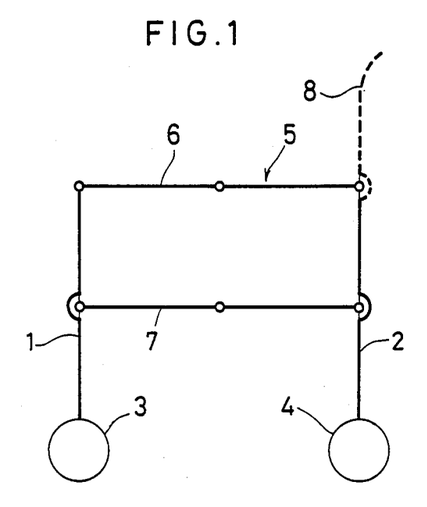
FIGS. 1 and 2 are diagrammatic side views of a baby carriage for explaining the basic concept of this invention, FIG. 1 showing the opened state and FIG. 2 the closed state.
Figure 2:
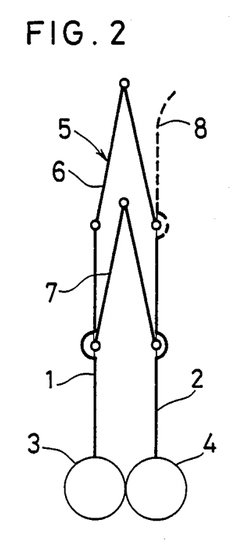

FIGS. 1 and 2 are diagrammatic side views of a baby carriage showing the basic concept of the invention. In FIG. 1 showing the baby carriage in the opened unfolded state, the carriage has a pair of front legs 1 and a pair of rear legs 2. A front wheel 3 is rotatably attached to the lower end of each front leg 1. A rear wheel 4 is rotatably attached to the lower end of each rear leg 2. A seat section (not shown) is positioned so that it extends between the front and rear legs 1 and 2. The seat section may further extend forwardly and rearwardly beyond the front and rear legs 1 and 2. Lateral frames 5 are positioned on opposite sides of the seat section. Each lateral frame 5 extends between the front and rear legs 1 and 2 on the same or respective side.

The lateral frame 5, as shown in FIG. 2, is foldable in a lateral plane of the baby carriage. Therefore, when the lateral frames 5 assume the extended unfolded state, the front and rear legs 1 and 2 are spaced from each other to establish the opened state of the baby carriage shown in FIG. 1. On the other hand, when the lateral frames 5 assume the folded state, the front and rear legs 1 and 2 move toward each other to establish the closed state of the baby carriage shown in FIG. 2.

In FIGS. 1 and 2, each lateral frame 5 comprises two foldable lateral rod members 6 and 7. The lateral rod members 6 and 7 are turnably connected to their opposite ends to the front and rear legs 1 and 2 on the same side. Further, the lateral rod members 6 and 7 are disposed side by side and one above the other.

In addition, a push rod 8 for pushing the baby carriage may be mechanically fixed to the rear legs 2, as shown in dotted lines in FIGS. 1 and 2.

FIGS. 1 and 2 diagrammatically show parts which take part in the opening and closing operation of the baby carriage, with means for locking the opened or unfolded state of the baby carriage and means for controlling the direction of rotation of links being omitted from the illustration. In FIGS. 3 to 14 to be described below, these means are also omitted from the illustration.

In FIGS. 3 to 14, some modifications derived from the basic concept of the invention illustrated in FIGS. 1 and 2 are shown. These modifications will now be described using the same reference numerals for the same parts.

Figure 3:
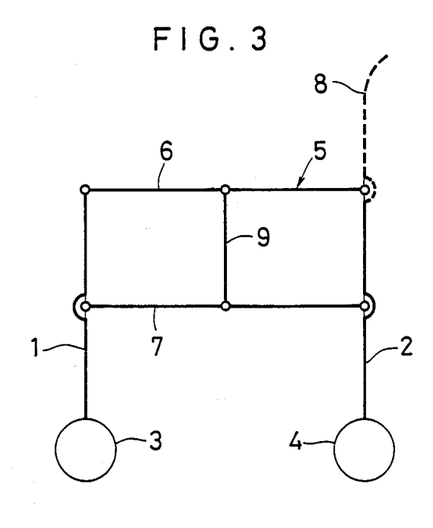
FIGS. 3 and 4, 5 and 6, 7 and 8, 9 and 10, 11 and 12, and 13 and 14 are diagrammatic side views of various baby carriages with the basic concept of the invention developed, the odd-numbered figures showing the opened state and the even-numbered figures the closed state.
Figure 4:
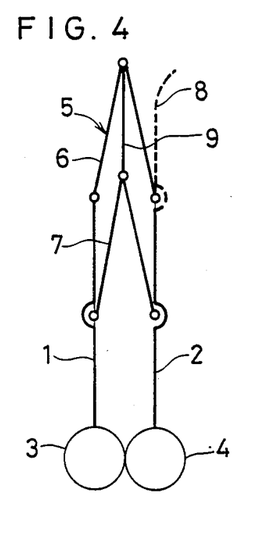

A baby carriage shown in FIGS. 3 and 4 includes a connecting link 9 forming a portion of each lateral frame 5, said connecting link connecting the lateral rod members 6 and 7. The connecting link 9 connects the lateral rod members 6 and 7 at their folding points. The presence of the connecting link 9 causes the folding and unfolding movement of one of the lateral rod members 6 and 7 to be operatively associated with that of the other.

Figure 5:
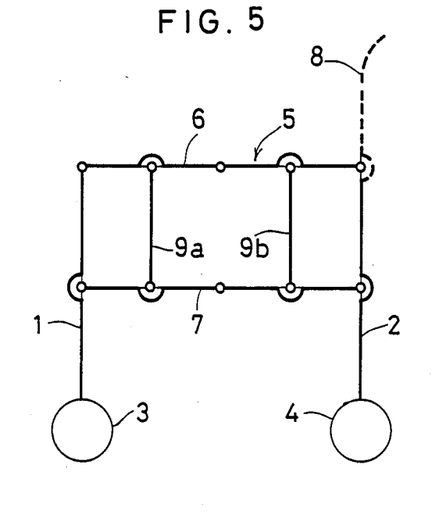
Figure 6:
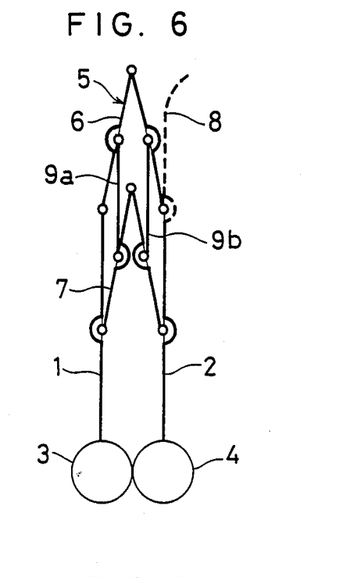

A baby carriage shown in FIGS. 5 and 6 includes connecting links 9a and 9b which perform the same function as that of the connecting link 9 described above. The connecting links 9a and 9b are connected to the lateral rod members 6 and 7 at positions spaced from their folding points.

Figure 7:
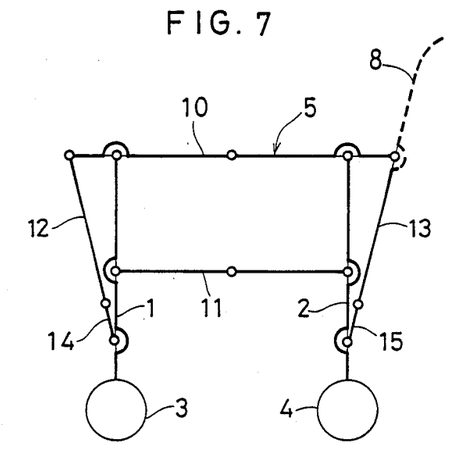
Figure 8:
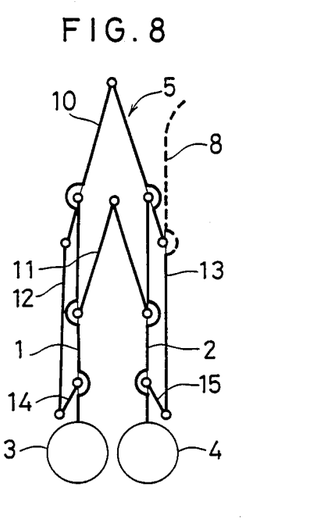

In a baby carriage shown in FIGS. 7 and 8, the lateral frames 5 each include upper and lower foldable lateral rod members 10 and 11 disposed side by side and one above the other. The upper lateral rod member 10 is turnably connected to the front and rear legs 1 and 2 on the same side, with its opposite ends projecting beyond said front and rear legs 1 and 2. The projecting ends of the upper lateral rod member 10 have the upper ends of prop rods 12 and 13 turnably connected thereto. The lower ends of the prop rods 12 and 13 have one of the respective ends of reverse-turn rods 14 and 15 turnably connected thereto, the other ends of said reverse-turn rods 14 and 15 being turnably connected to the front and rear legs 1 and 2, respectively. On the other hand, the lower lateral rod member 11 is turnably connected at its opposite ends to the front and rear legs 1 and 2 on the same side. In addition, in this modification, the push rod 8 is mechanically fixed to the prop rod 13 associated with the rear leg 2.

The baby carriage shown in FIGS. 7 and 8 is arranged so that it assumes the opened state when the reverse-turn rods 14 and 15 assume their upward attitude. The carriage assumes the closed state when the reverse-turn rods assume their downward attitude.

Figures 9, 10:
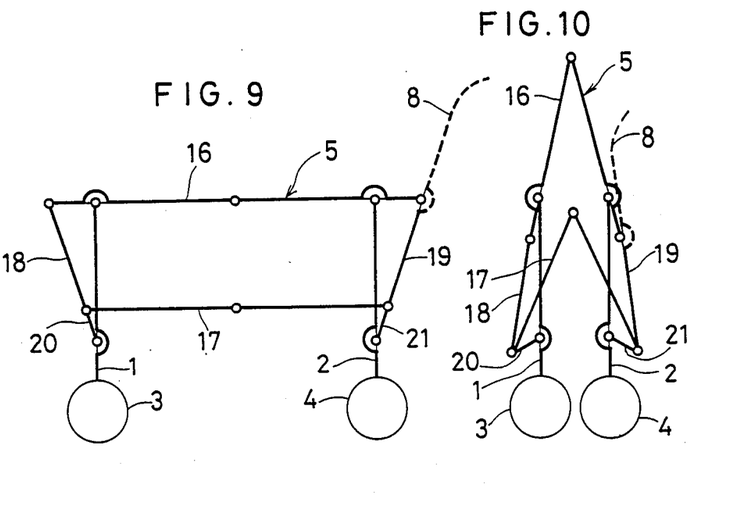

The lateral frames 5 of a baby carriage shown in FIGS. 9 and 10 each include upper and lower foldable lateral rod members 16 and 17 disposed side by side and one above the other. Upper lateral rod member 16 is turnably connected at its opposite ends to the front and rear legs 1 and 2 on the same side, with its opposite ends projecting beyond said front and rear legs 1 and 2. The projecting ends of the upper lateral rod member 16 have upper ends of prop rods 18 and 19 turnably connected thereto. The lower ends of the prop rods 18 and 19 are connected to respective ends of reverse-turn rods 20 and 21. The other ends of said reverse-turn rods 20 and 21 are turnably connected to the front and rear legs 1, respectively. The arrangement described so far is substantially the same as in the baby carriage shown in FIGS. 7 and 8 except that, the lower lateral rod member 17 is turnably connected at its opposite ends to the reverse-turn rods 20 and 21 at said one of their respective ends. As can be seen from this example, each lateral frame 5 may include members not directly connected to the front and rear legs 1 and 2.

Baby carriages shown in FIGS. 11 and 12 and FIGS. 13 and 14 have particular elements added thereto while being based on the baby carriage shown in FIGS. 9 and 10.

Figures 11, 12:
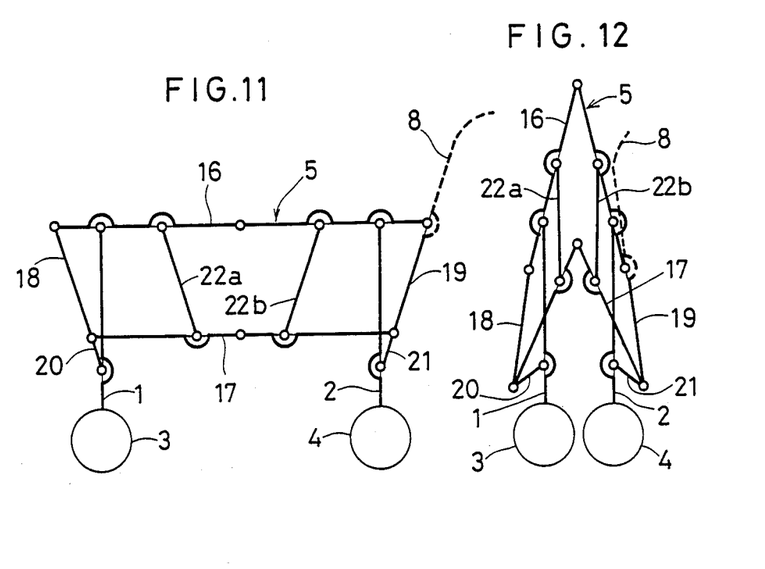

In FIGS. 11 and 12, connecting links 22a and 22b are added for operatively connecting the upper and lower lateral rod members 16 and 17, whereby the folding and unfolding movement of one of the upper and lower lateral rod members 16 and 17 is operatively associated with that of the other.

Figure 13:
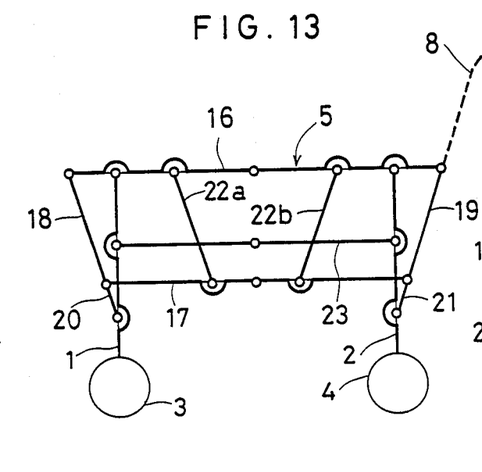
Figure 14:
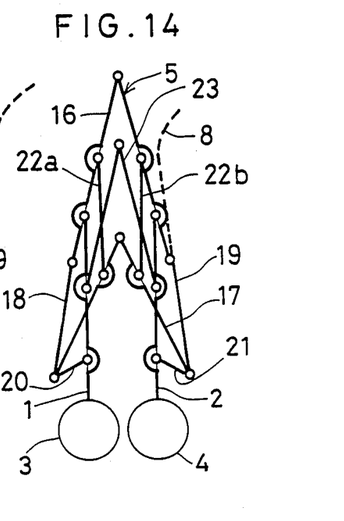

In FIGS. 13 and 14, a foldable locking rod 23 is turnably connected to the front and rear legs 1 and 2 on the respective side. The locking rod 23 is arranged so that its folding movement can be selectively inhibited; thus, unless it is folded, the closed state shown in FIG. 14 is not obtained.

In addition, in the baby carriages shown in FIGS. 9 and 10, 11 and 12, and 13 and 14, when the baby carriage is opened, the lower ends of the prop rods 18 and 19 abut against the front and rear legs 1 and 2, respectively, and the terminal ends of turning movements of the prop rods 18 and 19 relative to the reverse-turn rods 20 and 21 and the terminal ends of turning movements of the reverse-turn rods 20 and 21 relative to the front and rear ends 1 and 2 are respectively defined.

The baby carriage of the invention is arranged so that when it is in the opened state as shown in FIGS. 1, etc., the lateral frames 5 assume the unfolded state and the spacing between the front and rear legs 1 and 2 is maintained wide. Therefore, the wheel base between the front and rear wheels 3 and 4 is lengthened, so that a seat section which is long in the direction of travel of the baby carriage can be installed in a stabilized manner.

DESCRIPTION OF THE PREFERRED EMBODIMENTS

Figure 15:
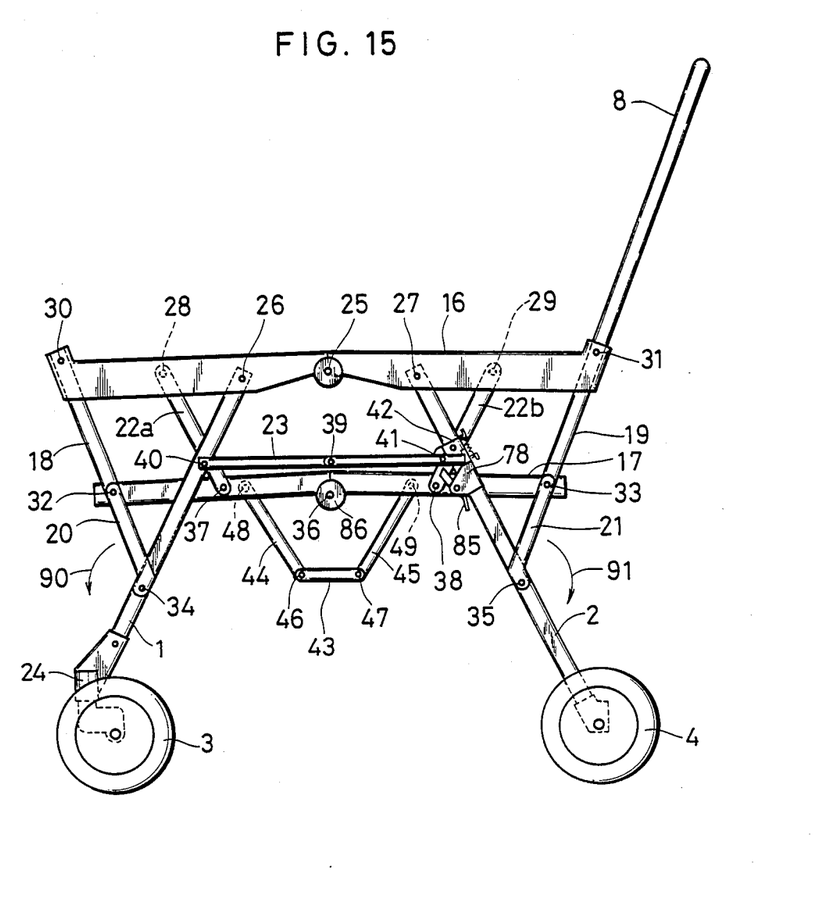
FIGS. 15 and 16 are side views showing a skeleton construction for a baby carriage according to an embodiment of the invention, FIG. 15 showing the opened state and FIG. 16 the closed state.
Figure 16:
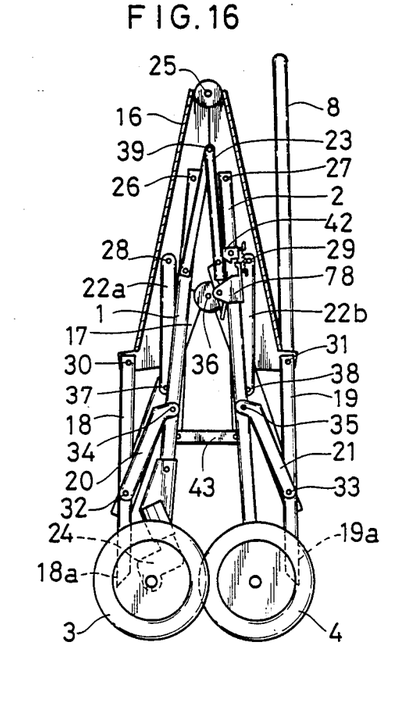

In FIGS. 15 and 16, the opened and closed states of a skeleton construction for a baby carriage which forms an embodiment of the invention are shown. This baby carriage is the same as the baby carriage shown in FIGS. 13 and 14 in the manner of connection of links and includes all the components shown in FIGS. 13 and 14. Thus, like reference characters are applied to like members. The following description is given on the basis of the opened state of the baby carriage unless otherwise specified.

The front and rear legs 1 and 2 assume an inverted V shape, having front and rear wheels 3 and 4 rotatably attached to their lower ends. Particularly, it is preferable to use a caster 24 through which the front wheel 3 is attached to the front leg 1.

The upper lateral rod member 16 has a folding point 25 at the middle. At positions a predetermined distance away to opposite sides from the folding point 25, the upper ends of the front and rear legs 1 and 2 are turnably connected to the upper lateral rod member 16 through pivot poins 26 and 27.

The portions of the upper lateral rod member 16 further projecting from the pivot points 26 and 27 have the upper ends of connecting links 22a and 22b turnably connected thereto through pivot points 28 and 29. In addition, the positional relationship between the pivot points 26 and 28 and between the pivot points between 27 and 29 is reversed from that for the baby carriage shown in FIG. 13.

The upper ends of the prop rods 18 and 19 are turnably connected to the opposite ends of the upper lateral rod member 16 through pivot points 30 and 31.

The lower ends of the prop rods 18 and 19 have one of the respective ends of the reverse-turn rods 20 and 21 turnably connected thereto through pivot points 32 and 33. The other ends of the reverse-turn rods 20 and 21 are turnably connected to the front and rear legs 1 and 2 through pivot points 34 and 35, respectively.

The lower lateral rod member 17 has a folding point 36 at the middle. At positions a predetermined distance away to opposite sides from the folding point 36, the lower ends of said connecting links 22a and 22b are turnably connected to the lower lateral rod member 17 through pivot points 37 and 38.

The opposite ends of the lower lateral rod member 17 are turnably connected to the reverse-turn rods 20 and 21 and prop rods 18 and 19 through said pivot points 32 and 33 disposed at one of the respective ends of the reverse-turn rods 20 and 21.

The locking rod 23 has a folding point 39 at the middle. And it is turnably connected to the front and rear legs 1 and 2 through pivot points 40 and 41. In practice, one pivot point 41 is positioned on a bracket 42 fixed to the rear leg 2. This bracket 42 and its related arrangement will be later described with reference to FIGS. 21 to 24.

Shown below the lower lateral rod member 17 is a footrest 43. The footrest 43 is suspended from the lower lateral rod member 17 through suspension links 44 and 45. The suspension links 44 and 45 are turnably connected to the footrest 43 through pivot points 46 and 47 and also to the lower lateral rod member 17 through pivot points 48 and 49.

Figure 17:
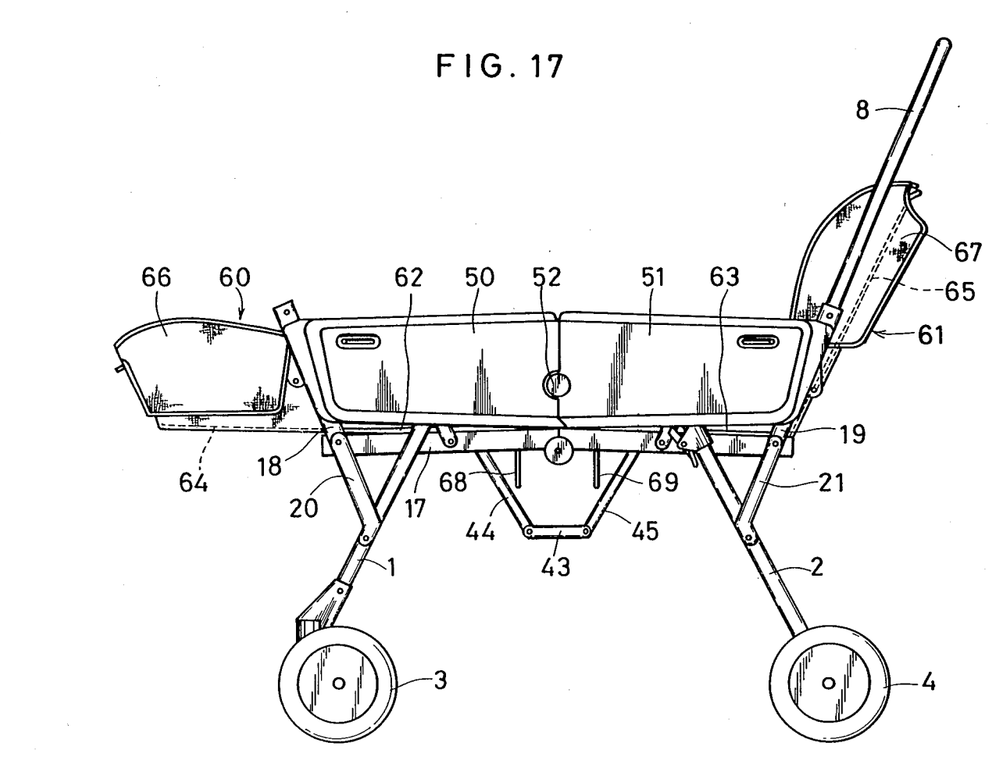
FIGS. 17 and 18 are side views of the baby carriage shown in FIGS. 15 and 16, with a seat section and other parts added thereto, FIG. 17 showing the opened state and FIG. 18 the closed state.
Figure 18:
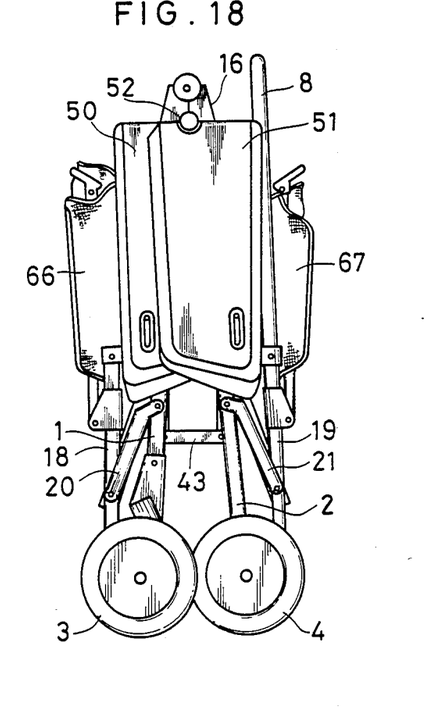

FIGS. 17 and 18 correspond to FIGS. 15 and 16, respectively, showing the baby carriage in its complete form equipped with a seat section, etc.

The arrangement of the seat section will be later described with reference to FIGS. 19 and 20; the baby carriage shown in FIGS. 17 and 18 is provided with lateral plates 50 and 51 along the upper lateral rod member 16. These lateral plates 50 and 51 are turnable relative to each other around a pivot point 52 and adapted to follow the folding movement of the upper lateral rod 16. The lateral plates 50 and 51 are held in place by the upper lateral rod member 16. The plates 50 and 51 are also connected to the pivot point 52 so that when the baby carriage is closed, the lateral plates 50 and 51 overlap each other, as shown in FIG. 18. Otherwise the manner of installation of the lateral plates has nothing to do with the invention and will not be further described.

Figure 19:
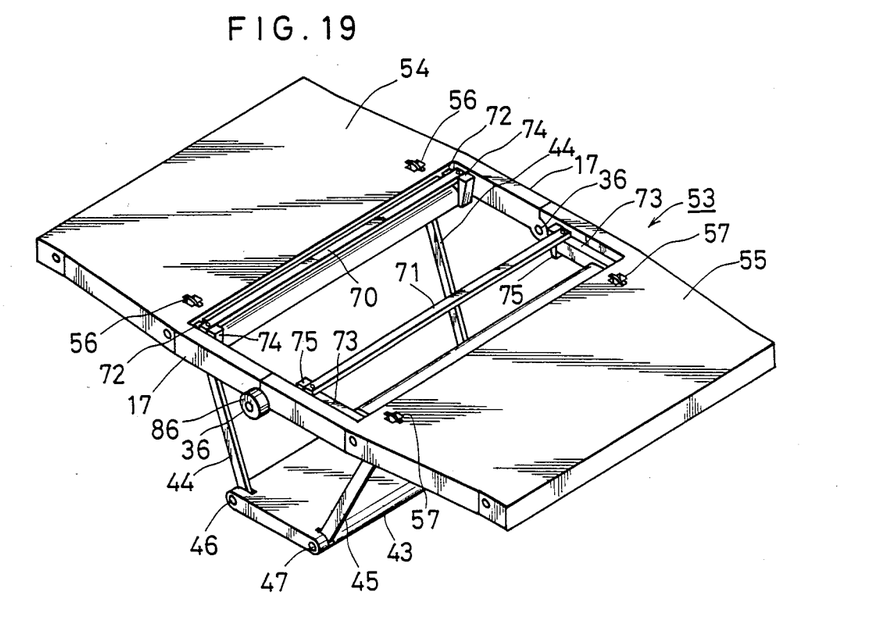
FIG. 19 is a perspective view of a seat surface holding member 53.

In FIG. 19, a seat surface holding member 53 for holding the seat surface of the seat section of the baby carriage is shown in perspective view. The seat surface holding member 53 is integrally formed at its opposite sides with the aforesaid lower lateral rod members 17. The seat surface holding member 53 is divided at the aforesaid folding point 36 into two parts, i.e., a front portion 54 and a rear portion 55. The front and rear portions 54 and 55 have attachment holes 56 and 57 for receiving the upper ends of the aforesaid suspension links 44 and 45. As shown in FIG. 20, at the upper end of the suspension link 44, a pin 58 which provides the aforesaid pivot point 48 projects from the opposite surfaces of the suspension link 44. On the other hand, U-shaped bearings 59 are formed on opposite sides of the attachment hole 56 for turnably supporting the pin 58 at its opposite ends. In addition, the same arrangement is made at the upper end of the suspension link 45.

As shown in FIG. 17, this baby carriage is provided with two independent seat sections, i.e., a front seat section 60 and a rear seat section 61. The seat sections 60 and 61, as diagrammatically shown in FIG. 17, are provided with seats 62 and 63 and backrests 64 and 65, respectively. The backrests 64 and 65, whose detailed mechanisms are omitted from the illustration, are made reclinable using a known mechanism. In FIG. 17, the backrest 64 is shown lowered, while the backrest 65 is shown raised. Lateral walls 66 and 67 are provided on opposite sides of each of the backrest 66 and 67.

Figure 20:
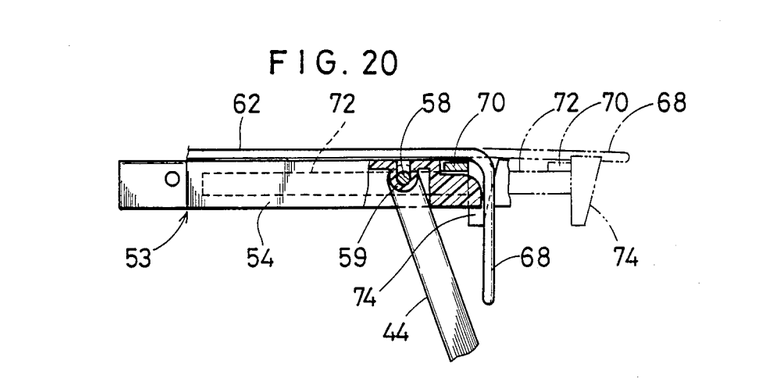
FIG. 20 is a side view, partly in section, of the front portion 54 of the seat surface holding member 53.

As shown in FIG. 20, the seat 62 of the front seat section 60 is positioned on the front portion 54 of the seat surface holding member 53. At this time, the seat 62 and the front portion 54 may be fixed together by suitable fixing means. The front end portion 68 of the seat 62 hangs downwardly from the front end edge of the front portion 54. The front end portion 68 also forms an extension of the seat 62 by means of the following arrangement.

The same arrangement is also applied to the rear seat section 61, as shown in FIG. 17 wherein the front end portion 69 of the seat 63 hangs downwardly.

Referring to FIGS. 19 and 20, seat raising members 70 and 71 are disposed along the front end edges of the front and rear portions 54 and 55 of the seat surface holding member 53. The seat raising members 70 and 71 connect slide guide rods 72 and 73 which respectively form pairs. The slide guide rods 72 and 73 respectively forming pairs are slidably inserted into the front and rear portions 54 and 55, respectively. The slide guide rods 72 and 73 have operating knobs 74 and 75, respectively, formed on the front ends thereof.

If the slide guide rods 72 and 73 are pulled out through the operating knobs 74 and 75, the seat raising members 70 and 71 are brought to positions spaced from the front end edges of the front and rear portions 54 and 55. In FIG. 19, the slide guide rod 73 is shown pulled out, with the corresponding seat raising member 71 spaced from the front end edge of the rear portion 55. Further, in FIG. 20, the slide guide rod 72 is shown pulled out in phantom lines, with the seat raising member 70 spaced from the front end edge of the front portion 54. For example, as shown in phantom lines in FIG. 20, when the slide guide rod 72 is pulled out, the seat raising member 70 raises the front end portion 68 to a substantially horizontal position while contacting its lower surface. Thus, the front end portion 68 forms an extension forwardly of the seat section 62. The rear seat section 61 also has the same seat extending function.

This baby carriage can be used in various manners concerning the seat sections.

First, in both of the front and rear seat sections 60 and 61, two babies can be seated face to face with the backrests 64 and 65 raised. At this time, their feet can be placed on the footrest 43 with the front end portions 68 and 69 hanging downwardly or the babies can be seated with their legs stretched with the front end portions 68 and 69 held horizontally. Further, in these states, a single baby may occupy both the front and rear seat sections.

In both of the front and rear seat sections 60 and 61, the front end portions 68 and 69 can be used in the horizontal state with the backrests 64 and 65 lowered. At this time, a series of widest spaces are provided by the seat sections 60 and 61. In this state, a single baby may use both seat sections 60 and 61 or two babies may use them.

Further, in use, one of the backrests 64 and 65 of the front and rear seat sections 60 and 61 may be raised with the other lowered. In this case, one or both of the front end portions 68 and 69 may be held horizontal or both of them may hang downwardly. Thus various ways of use are possible. In this case, too, the seat sections 60 and 61 may be used by two babies or a single baby. In the opened state of the baby carriage shown in FIG. 15, the lower ends of the prop rods 18 and 19 abut against the front and rear legs 1 and 2. This state, though not altogether clear from FIG. 15, could be inferred from the lengths of the pivot points 32 and 33 for the lower ends 18a and 19a, as shown in FIG. 16, of the prop rods 18 and 19. The obliquely cut end surfaces of the lower ends 18a and 19a are adapted to contact the lateral surfaces of the front and rear legs 1 and 2. In this manner, the terminal end of the turning movement of the prop rods 18 and 19 relative to the reverse-turn rods 20 and 21 is defined and so is the terminal end of the turning movement of the reverse-turn rods 20 and 21 relative to the front and rear legs 1 and 2.

Further, when the baby carriage is in the opened state, the upper and lower lateral rod members 16 and 17 are at the terminal or end positions of a folding movement performed with the aid of the folding points 25 and 36. In these end positions the rod members cannot perform a folding movement would displace the folding points 25 and 36 further downwardly from the state shown in FIG. 15. A folding movement can be performed only so that the folding points 25 and 36 can be displaced upwardly.

In the state of FIG. 15, the fact that the locking rod 23 maintains its linear state contributes greatly to maintaining the opened state of the baby carriage. For example, if the front wheel 3 encounters some obstacle lying forwardly of said front wheel when the baby carriage is being pushed, a rearwardly directed force is imparted to the front wheel 3. In response thereto, the lower end of the front leg 1 is forced to move toward the lower end of the rear leg 2, with the result that the opening angle between the front and rear legs 1 and 2 which are opened in V-shape tends to be closed. In response thereto, the upper lateral rod member 16 would be sometimes folded through the folding point 25, causing undesirable folding of the baby carriage. It is the locking rod 23 that advantageously prevents this. The arrangement related to the locking rod 23 will now be described with reference to FIGS. 21 to 24 while also describing the folding operation of the baby carriage. In addition, FIGS. 21 to 24 show the location, enlarged, in which the locking rod 23 is attached to the rear leg 2.

Figures 21, 22:
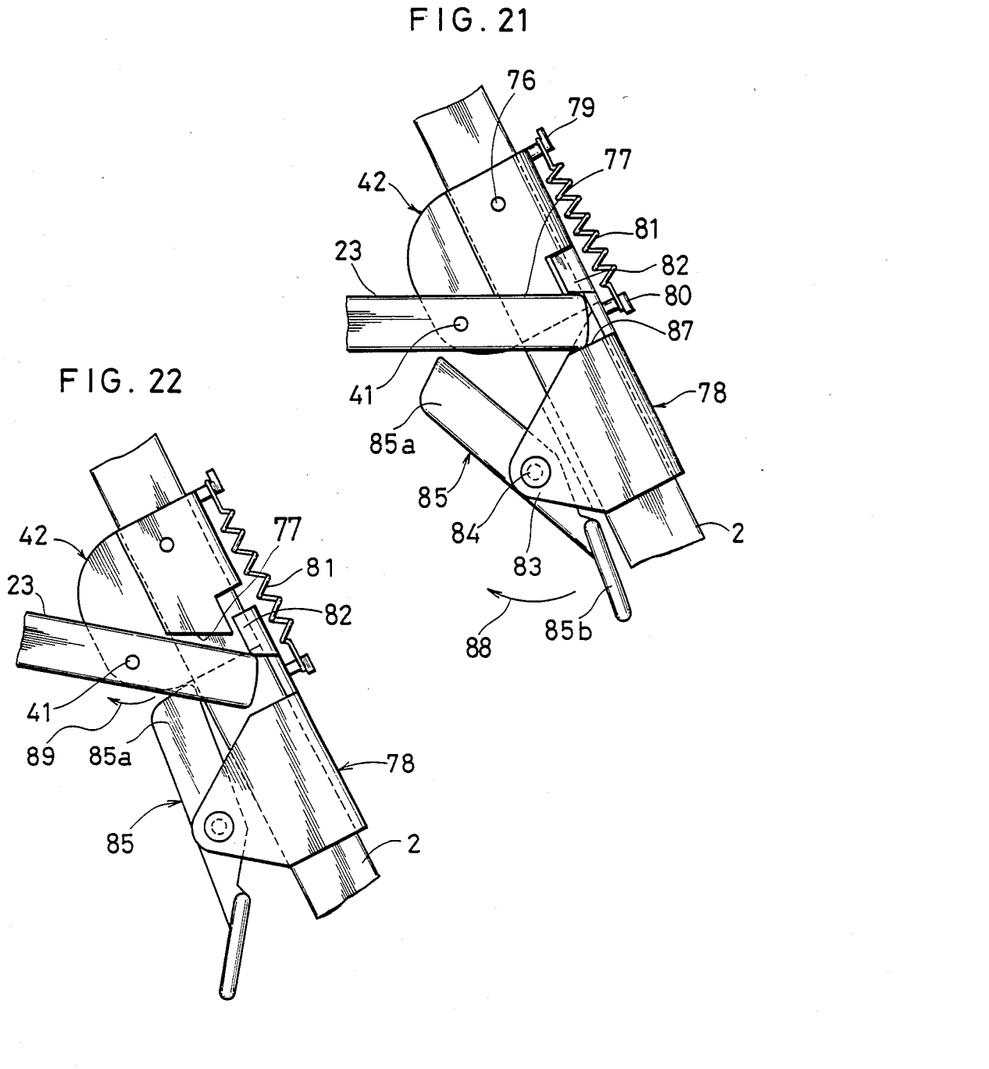
FIGS. 21 to 24 are enlarged views of a portion where a locking rod 23 is attached to a rear leg 2, showing the successive steps for changing the baby carriage from the opened to the closed state.

FIG. 21 corresponds to the opened state of the baby carriage shown in FIG. 15. The locking rod 23 is turnably attached to a bracket 42 by a pivot point 41 located on the bracket 42, as described previously. The bracket 42 is fixed to the rear leg 2 as by a rivet 76. The bracket 42 has an attitude control surface 77 adapted to abut against the lateral edge of the locking rod 23. Positioned below the bracket 42 is a slider 78 which is slidable on the rear leg 2. The bracket 42 is provided with a hook 79, while the slider 78 is provided with a hook 80, with a tension spring 81 stretched between said hooks 79 and 80, whereby, the slider 78 is constantly urged to slide upward on the rear leg 2.

The slider 78 has an unlocking engagement portion 82, which is positioned so that it is engageable with the locking rod 23 when aligned with the attitude control surface 77.

Further, the slider 78 has a ledge 83 to which an operating lever 85 is turnably attached through a pivot pin 84. One end of the operating lever 85, which is an active end 85a, is positioned within the range of the thickness of the bracket 42 is positioned where it does not interfere with the locking rod 23. The other end of the operating lever 85 has an operating end portion 85b. The operating end portion 85b forms a relatively wide surface which extends in the direction of the surface which is at right angles to the plane in which the operating lever 85 is turned. The operating end portion 85b is adapted to engage a boss 86 (FIG. 23), which surrounds the folding point 36 of the lower lateral rod member 17, when the baby carriage is changed from the opened to the closed state, as will be below described.

In FIG. 21, the tip end of the locking rod 23 extending beyond the pivot point 41 is brought into close contact with the attitude control surface 77 of the bracket 42 by the upper end surface 87 of the slider 78 urged by a tension spring 81, whereby as shown in FIG. 15, the locking rod 23 is maintained in the linear state, thus maintaining the opened state of the baby carriage.

To close the baby carriage, first, the lever 85 must be operated to turn in the direction of arrow 88. In response thereto, the active end 85a of the operating lever 85 moves to the lower surface of the bracket 42. Further turning movement of the operating lever 85 is inhibited by the active end 85a abutting against the rear leg 2. In this manner, the slider 78 is slid downwardly on the rear leg 2 against the elastic force of the tension spring 81 until the active end 85a comes in contact with the lower end of the bracket 42. Accompanying this downward slide movement, the lock canceling engagement portion 82 engages the end of the locking rod 23 to turn the locking rod 32 in the direction of arrow 89. In response to this turning movement, the locking rod 23 is folded around the folding point 39 into an inverted V-shape as a whole.

In response to the aforesaid folding of the locking rod 23, the front and rear legs 1 and 2 are slightly turned in the directions which cause the front and rear wheels 3 and 4 to move toward each other. In response thereto, the upper lateral rod member 16 is folded to displace its folding point 25 slightly upward while the lower lateral rod member 17 is folded through the connecting links 22a and 22b to displace its folding point 36 slightly upwardly. Thus the upper and lower lateral rod members 16 and 17 are ready for a folding and the following folding operation will proceed relatively easily. For example, the folding operation that follows is effected by applying a force which causes the opposite ends of the upper lateral rod member 16 to move toward each other. In response thereto, the upper lateral rod member 16 is further folded through the folding point 25. The folding movement of the upper lateral rod member 18 is transmitted to the lower lateral rod member 17 through the connecting links 22a and 22b, whereby the lower lateral rod member 17 is also folded.

Further, the folding movement of the upper lateral rod member 16 displaces the pivot points 26 and 27 upwardly and the pivot points 30 and 31 downwardly. Therefore, the front and rear legs 1 and 2 are moved toward each other, while the reverse-turn rods 20 and 21 are turned in the directions of arrows 90 and 91, respectively, shown in FIG. 15, so that the prop rods 18 and 19 are also turned into positions parallel to each other.

Figure 23:
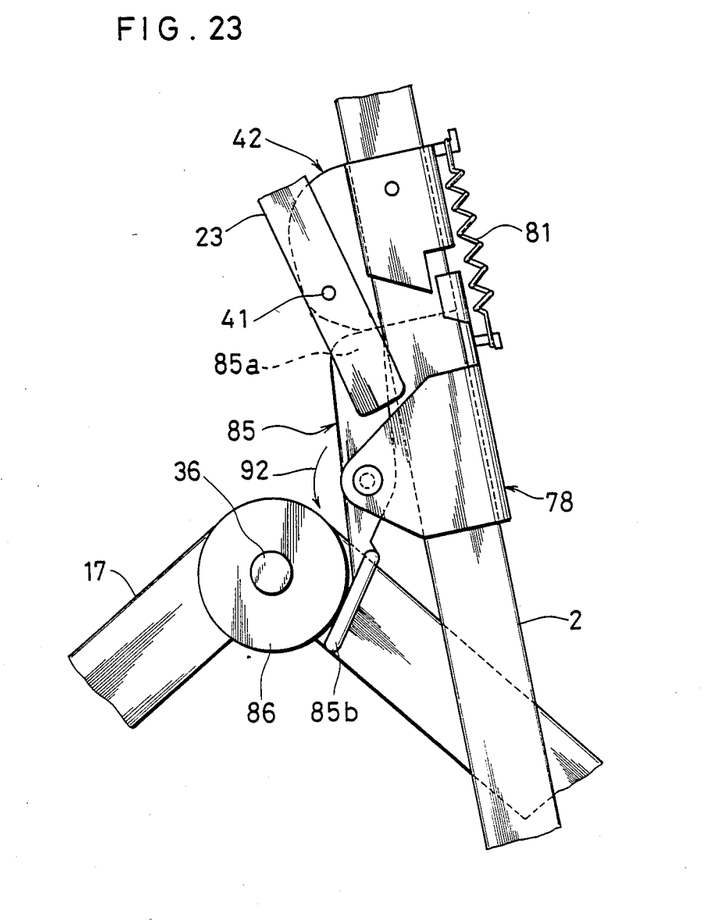

FIG. 23 shows a partially folded state resulting from the aforesaid operation whereby the lower lateral rod member 17 is folded into an inverted V-shape. With attention paid to the position of the boss 86 formed to surround the folding point 36 of the lower lateral rod member 17, it is seen that it has been brought to a position where it can abut against the operating end portion 85b of the operating lever 85. When the folding operation proceeds further from the state shown in FIG. 23, the boss 86 is displaced while contacting the operating end portion 85b, as shown in FIG. 24, thus giving the operating lever 85 a force which causes it to turn in the direction of arrow 92.

Figure 24:
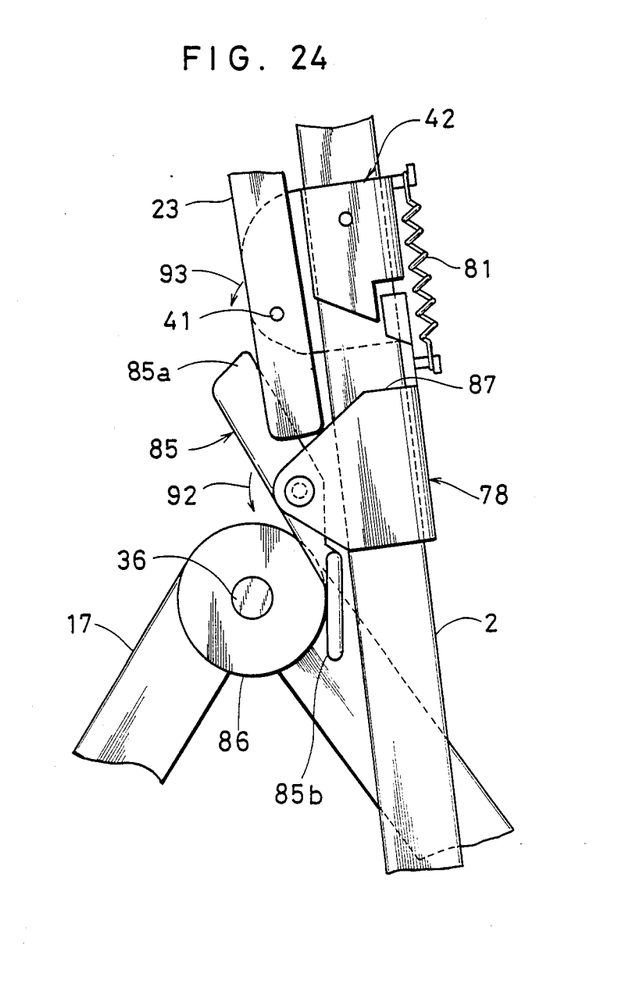

As shown in FIG. 24, when the operating lever 85 is turned, the locking rod 23 has already been turned until it is substantially parallel to the rear leg 2. When the operating lever 85 has been turned in the direction of arrow 92, as described above, its active end 85a leaves the lower surface of the bracket 42 and the slider 78 tends to slide on the rear leg 2 upwardly under the action of the elastic force of the tension spring 81. In the state shown in FIG. 24, the slider 78 has slid until it abuts the end of the locking rod 23. The attitude of the operating lever 24 shown in FIG. 24, when seen from its connection with the rear leg 2, is substantially the same as that shown in FIG. 21.

The folding operation further proceeds from the state shown in FIG. 24 and finally the closed state of the baby carriage shown in FIG. 16 is obtained.

The direction of the front wheel 3 shown in FIG. 16 is one which results from the direction of the front wheel 3 shown in FIG. 15 being turned through 180 degrees. This is due to the fact that the front wheel 3 is supported by the front leg 1 through the caster 24, and in FIG. 16, the axle of the front wheel 3 is positioned forwardly of the caster 24. Thereby, the front wheel 3 is placed on a level with the rear wheel 4, so that the baby carriage can stand by itself. In addition, even if the baby carriage is folded with the front wheel 3 maintained in the state shown in FIG. 15, there will be no interference with the folding operation.

A brief description will now be given of an operation for changing the closed state of the baby carriage shown in FIG. 16 to the opened state shown in FIG. 15. This operation, which is effected by reversely following the operation described above, will now be described with particular attention paid to the action of the locking rod 23.

In the initial stage of the operation for opening the baby carriage, the state shown in FIG. 24 is obtained. When the baby carriage is further opened from this state, the locking rod 23 is turned around the pivot point 41 in the direction of arrow 93. During this turning movement, since the slider 78 is constantly urged by the tension spring 81 to slide upwardly, it slides on the rear leg 2 while maintaining its state of contact with the end of the locking rod 23. And when the baby carriage has been opened, as shown in FIG. 21, the slider 78 pushes up the end of the locking rod 23 by its upper end surface 87. Thereby, the linear state of the locking rod 23 shown in FIG. 15 is automatically obtained.

Although the present invention has been described and illustrated in detail, it is clearly understood that the same is by way of illustration and example only and is not to be taken by way of limitation, the scope of the present invention being limited only by the terms of the appended claims.

What is claimed is:

1. A baby carriage comprising a pair of front legs (1), a pair of rear legs (2), a seat section (60, 61), and lateral frames (5) each extending between the front and rear legs on a respective side of said baby carriage, wherein each lateral frame is foldable in a lateral plane of the baby carriage, whereby when the lateral frames assume an extended state, said front and rear legs are spaced away from each other to establish an opened state of the baby carriage, while when the lateral frames assume the folded state, said front and rear legs are moved toward each other to estabish a closed state of the baby carriage, wherein each of said lateral frames (5) includes an upper lateral rod member (10) and a lower lateral rod member (11) which are both foldable and which are disposed one above the other, and prop rods connecting said upper and lower lateral rod members to each other, said upper lateral rod member having opposite ends turnably connected to said front and rear legs so that said upper lateral rod member extends between said front and rear legs (1, 2) on the same side, said upper lateral rod member being turnably connected to upper ends of said prop rods (18, 19), the lower ends of said prop rods having one of respective ends of reverse-turn rods (20, 21) turnably connected thereto, the other ends of said reverse-turn rods being turnably connected to the front and rear legs, and wherein the lower lateral rod member is turnably connected at its opposite ends to said one of the respective ends of said reverse-turn rods.

2. The baby carriage of claim 1, further including a connecting link (22a, 22b) for interconnecting said upper and lower lateral rod members (16, 17), whereby the folding and unfolding movements of said upper and lower rod members are operatively associated with each other.

3. The baby carriage as set forth in claim 1, wherein when the baby carriage is opened, the lower ends of said prop rods (18, 19) abut against said front and rear legs (1, 2), whereby terminal ends of turning movements of said prop rods relative to the reverse-turn rods (20, 21) and terminal ends of turning movements of the reverse-turn rods relative to the front and rear legs, are defined.

4. The baby carriage of claim 1, further including a foldable locking rod (23) turnably connected to said front and rear legs (1, 2) on the same side, said locking rod including means for selectively preventing a turning of said locking rod.

* * * * *